US009900620B2

(12) United States Patent
Lee et al.

(10) Patent No.: US 9,900,620 B2
(45) Date of Patent: Feb. 20, 2018

(54) APPARATUS AND METHOD FOR CODING/DECODING MULTI-VIEW IMAGE

(71) Applicant: SAMSUNG ELECTRONICS CO., LTD., Suwon-si, Gyeonggi-do (KR)

(72) Inventors: Jin Young Lee, Yongin-si (KR); Jae Joon Lee, Yongin-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 373 days.

(21) Appl. No.: 14/432,404

(22) PCT Filed: Sep. 25, 2013

(86) PCT No.: PCT/KR2013/008564
§ 371 (c)(1),
(2) Date: Mar. 30, 2015

(87) PCT Pub. No.: WO2014/051321
PCT Pub. Date: Apr. 3, 2014

(65) Prior Publication Data
US 2015/0245065 A1 Aug. 27, 2015

Related U.S. Application Data

(60) Provisional application No. 61/707,537, filed on Sep. 28, 2012, provisional application No. 61/746,276, filed on Dec. 27, 2012.

(30) Foreign Application Priority Data

Sep. 23, 2013 (KR) ........................ 10-2013-0112745

(51) Int. Cl.
H04N 19/52 (2014.01)
H04N 19/597 (2014.01)
H04N 19/176 (2014.01)

(52) U.S. Cl.
CPC ......... *H04N 19/597* (2014.11); *H04N 19/176* (2014.11); *H04N 19/52* (2014.11)

(58) Field of Classification Search
CPC ..... H04N 19/176; H04N 19/52; H04N 19/597
(Continued)

(56) References Cited

U.S. PATENT DOCUMENTS 8,532,175 B2* 9/2013 Pandit ................. H04N 19/597
348/394.1
9,451,255 B2* 9/2016 Takahashi ........... H04N 19/593
(Continued)

FOREIGN PATENT DOCUMENTS

CN 101248671 8/2008
CN 101601304 12/2009
(Continued)

OTHER PUBLICATIONS

Silva et al, Inter-view prediction of coding tree depth for HEVC-based multiview video coding, 2013.*
(Continued)

*Primary Examiner* — Shan Elahi
(74) *Attorney, Agent, or Firm* — Staas & Halsey LLP

(57) ABSTRACT

A system for coding/decoding a multi-view image. The system according to an example embodiment may comprise an apparatus for coding the multi-view image and an apparatus for decoding the multi-view image. The apparatus for coding the multi-view image may determine a predictive motion vector most appropriate for a current block from a plurality of candidate motion vectors, and transmit an index of the predictive motion vector that is determined to the apparatus for decoding the multi-view image.

22 Claims, 11 Drawing Sheets

(58) Field of Classification Search
USPC .................................................. 375/240.16
See application file for complete search history.

(56) References Cited

U.S. PATENT DOCUMENTS

| | | | | |
|---|---|---|---|---|
| 2008/0170618 A1* | 7/2008 | Choi | .................. | H04N 13/0022 |
| | | | | 375/240.16 |
| 2011/0038418 A1* | 2/2011 | Pandit | ..................... | G06T 9/001 |
| | | | | 375/240.16 |
| 2011/0044550 A1* | 2/2011 | Tian | ..................... | H04N 19/597 |
| | | | | 382/238 |
| 2012/0008688 A1* | 1/2012 | Tsai | ....................... | H04N 19/52 |
| | | | | 375/240.16 |
| 2012/0014614 A1 | 1/2012 | Takahashi et al. | | |
| 2012/0213282 A1 | 8/2012 | Choi et al. | | |
| 2012/0320969 A1* | 12/2012 | Zheng | .................... | H04N 19/52 |
| | | | | 375/240.02 |
| 2013/0077691 A1* | 3/2013 | Zheng | ................. | H04N 19/105 |
| | | | | 375/240.16 |
| 2013/0083583 A1* | 4/2013 | Crisp | ...................... | H01L 23/13 |
| | | | | 365/63 |
| 2013/0083853 A1* | 4/2013 | Coban | .................. | H04N 19/563 |
| | | | | 375/240.16 |
| 2014/0348233 A1* | 11/2014 | Kondo | ................. | H04N 19/593 |
| | | | | 375/240.12 |
| 2017/0127082 A1* | 5/2017 | Chen | ...................... | H04N 19/52 |

FOREIGN PATENT DOCUMENTS

| | | |
|---|---|---|
| CN | 102340670 | 2/2012 |
| KR | 10-2007-0011147 | 1/2007 |
| KR | 10-2012-0080122 | 7/2012 |
| WO | WO 2011/031030 | 3/2011 |
| WO | WO 2011/062392 | 5/2011 |
| WO | WO 2012/081877 | 6/2012 |
| WO | WO 2012/093879 | 7/2012 |

OTHER PUBLICATIONS

International Search Report dated Jan. 8, 2014 from International Patent Application No. PCT/KR2013/008564.

Chinese Office Action dated Aug. 22, 2017 in corresponding Chinese Patent Application No. 201380051015.4.

* cited by examiner

APPARATUS AND METHOD FOR CODING/DECODING MULTI-VIEW IMAGE

CROSS-REFERENCE TO RELATED APPLICATIONS

This application is a U.S. National Phase application of International Application No. PCT/KR2013/008564 filed on Sep. 25, 2013, which claims the priority benefit of U.S. Provisional Application No. 61/707,537, filed on Sep. 28, 2012 in the U.S. Patent and Trademark Office and U.S. Provisional Application No. 61/746,276, filed on Dec. 27, 2012 in the U.S. Patent and Trademark Office and claims foreign priority benefit of Korean Application No. 10-2013-0112745, filed on Sep. 23, 2013, in the Korean Intellectual Property Office, the disclosures of each of which are incorporated herein by reference.

BACKGROUND

1. Field

The following description relates to a multi-view image coding apparatus and method for encoding a multi-view image, and a multi-view image decoding apparatus and method for decoding an encoded multi-view image.

2. Description of the Related Art

A stereoscopic image refers to a three-dimensional (3D) image that simultaneously provides shape information about a depth and a space together with image information. Different from a stereo image that simply provides images of different views to left and right eyes of a user, respectively, the stereoscopic image is seen as if viewed from different directions as the user varies the user's point of view. Therefore, images taken from different views are used to create the stereoscopic image.

Since images taken at a plurality of views have a large amount of data, it is almost impracticable to encode the taken images using a single-view video coding method, such as MPEG-2, H.264/AVC, and high efficiency video coding (HEVC), in consideration of a network infrastructure and a terrestrial bandwidth.

Accordingly, to further efficiently encode images taken from different views, there is a need for an encoding method suitable for a multi-view image. However, due to limitations in the network infrastructure and the terrestrial bandwidth, a multi-view video compression method is to be further efficiently enhanced.

SUMMARY

Additional aspects and/or advantages will be set forth in part in the description which follows and, in part, will be apparent from the description, or may be learned by practice of the invention.

A multi-view image coding method according to an example embodiment may include: identifying at least one motion vector candidate associated with encoding of a current block within a first view image; determining a predictive motion vector to be used for encoding of the current block based on the identified motion vector candidate; and transmitting an index of the predictive motion vector to a multi-view image decoding apparatus through a bitstream.

A multi-view image decoding method according to an example embodiment may include: extracting an index of a predictive motion vector from a bitstream received from a multi-view image coding apparatus; and determining a final motion vector of a current block within a first view image to be decoded based on the index of the predictive motion vector.

A multi-view image coding apparatus according to an example embodiment may include: a motion vector candidate identifier configured to identify a motion vector candidate associated with encoding of a current block within a first view image; a predictive motion vector determiner configured to determine a predictive motion vector to be used for encoding the current block based on the identified motion vector candidate; and a bitstream transmitter configured to transmit an index of the predictive motion vector to a multi-view image decoding apparatus through a bitstream.

A multi-view image decoding apparatus according to an example embodiment may include: an index extractor configured to extract an index of a predictive motion vector from a bitstream received from a multi-view image coding apparatus; and a final motion vector determiner configured to determine a final motion vector of a current block within a first view image to be decoded based on the index of the predictive motion vector.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION

Figure 1:
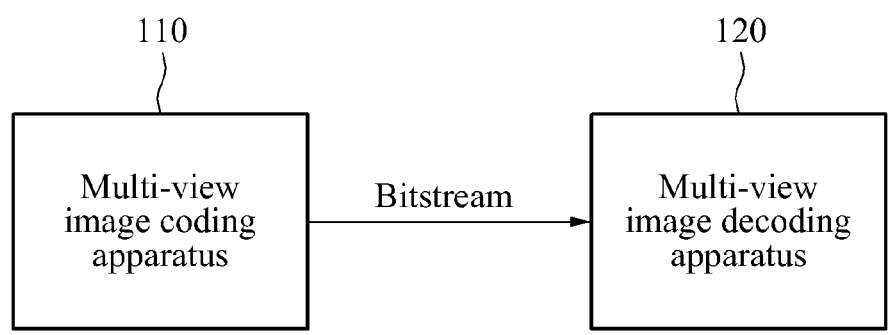
FIG. 1 is a block diagram to describe an operation of a multi-view image coding apparatus and a multi-view image decoding apparatus according to an example embodiment.

Hereinafter, embodiments will be described with reference to the accompanying drawings. The following specific structural and/or functional descriptions are provided to simply describe the embodiments, and thus, it should not be interpreted that the scope of the present disclosure is limited to the embodiments. A multi-view image coding method according to example embodiments may be performed by a multi-view image coding apparatus, and a multi-view image decoding method may be performed by a multi-view image decoding apparatus. Like reference numerals refer to like constituent elements.

Prior to describing the embodiments, terms disclosed in the embodiments or the claims may be defined as follows:

(1) Current block: The current block denotes a block to be encoded or decoded in an image of any one view included in a multi-view image.

(2) First view image: The first view image denotes a view image including a current block among view images included in a multi-view image. In an example embodiment, the first view image may have the same meaning as a current view image.

(3) Second view image: The second view image refers to a view image encoded or decoded prior to a first view image and denotes a view image of a view different from a view of the first view image.

(4) Corresponding block: The corresponding block denotes a block within a second view image corresponding to a current block.

(5) Co-located block: The co-located block denotes a block located at the same location as a current block within a frame of a view image encoded or decoded prior to a current view image and having the same view as a view of the current view image.

FIG. 1 is a block diagram to describe an operation of a multi-view image coding apparatus and a multi-view image decoding apparatus according to an example embodiment.

A multi-view image coding apparatus 110 according to an embodiment may encode a multi-view image, may generate encoded data in the form of a bitstream, and may transmit the bitstream to a multi-view image decoding apparatus 120. The multi-view image may include images taken at many views. The multi-view image has temporal redundancy present between temporally continuous images and inter-view redundancy present between images of different views. The multi-view image coding apparatus 110 may determine a motion vector capable of optimizing an encoding efficiency with respect to each block during a block-based encoding process, which may lead to reducing the redundancy between images.

The multi-view image coding apparatus 110 may encode the multi-view image in various encoding modes. The multi-view image coding apparatus 110 may encode the current block using a predictive motion vector denoting a prediction block most similar to the current block that is to be encoded. The multi-view image coding apparatus 110 may maximally remove the redundancy between images during a process of encoding the multi-view image, thereby representing the encoded multi-view image using a small amount of data, and thus, reducing the amount of data needed to transmit the multi-view images. The multi-view image coding apparatus 110 may use a block-based intra, inter, or inter-view prediction method to remove the redundancy between images.

The multi-view image coding apparatus 110 may identify various motion vector candidates in the current block, and may determine a predictive motion vector capable of optimizing the encoding efficiency of the current block among the motion vector candidates. The multi-view image coding apparatus 110 may transmit an index of the determined predictive motion vector to the multi-view image decoding apparatus 120 through a bitstream.

For example, the multi-view image coding apparatus 110 may discover a prediction block most similar to a current block in an image of a view different from a view image including the current block that is to be encoded. Alternatively, the multi-view image coding apparatus 110 may discover the prediction block most similar to the current block in a frame of a view image encoded prior to the view image including the current block. The multi-view image coding apparatus 110 may represent the predictive motion vector indicating a relationship between the current block and the prediction block, using the index of the predictive motion vector, and may transmit information about the index of the predictive motion vector to the multi-view image decoding apparatus 120.

The multi-view image decoding apparatus 120 may receive the encoded multi-view image from the multi-view image coding apparatus 110 in the form of the bitstream. Further, the multi-view image decoding apparatus 120 may extract, from the bitstream, the index of the predictive motion vector to be used for a decoding process. The multi-view image decoding apparatus 120 may identify the predictive motion vector from the extracted index of the predictive motion vector. The multi-view image decoding apparatus 120 may determine a final motion vector based on the predictive motion vector in an encoding mode applied for an encoding process of the multi-view image.

Figure 2:
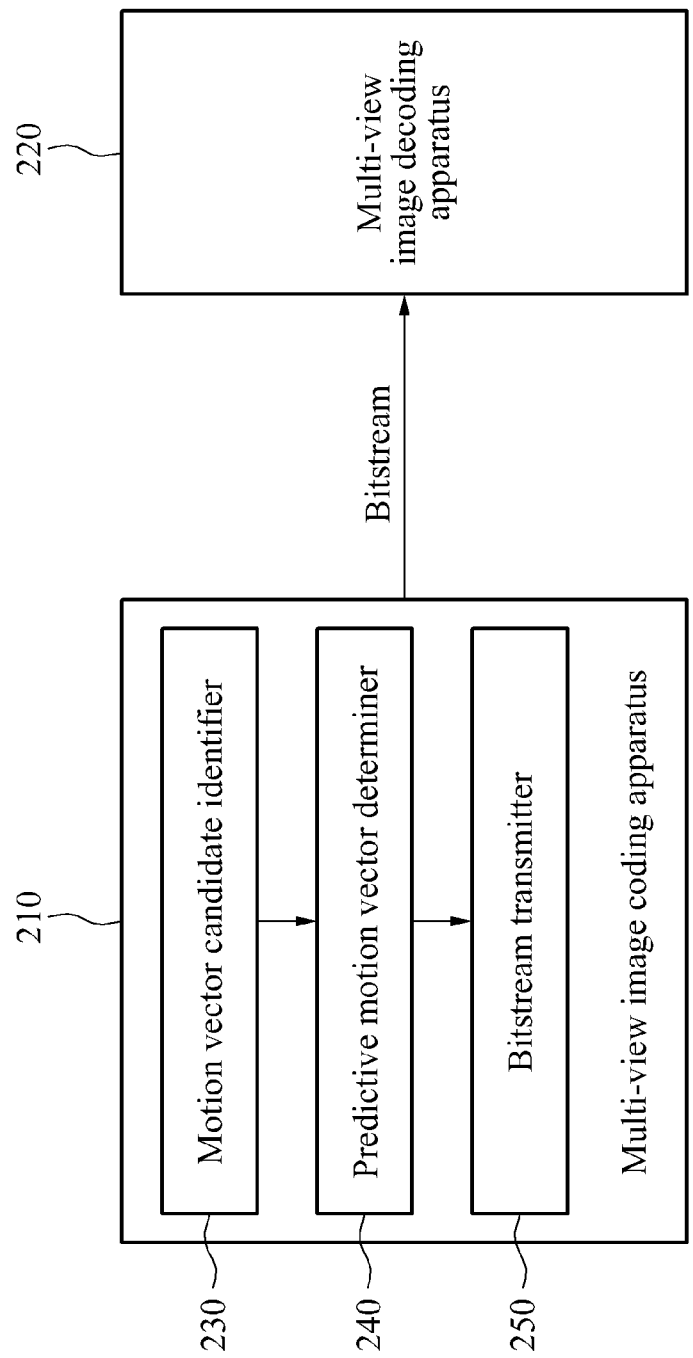
FIG. 2 is a block diagram illustrating a multi-view image coding apparatus according to an example embodiment.

FIG. 2 is a block diagram illustrating a multi-view image coding apparatus according to an example embodiment.

Referring to FIG. 2, a multi-view image coding apparatus 210 may include a motion vector candidate identifier 230, a predictive motion vector determiner 240, and a bitstream transmitter 250.

The motion vector candidate identifier 230 may identify at least one motion vector candidate associated with encoding of a current block within a first view image. For example, the motion vector candidate identifier 230 may identify at least one of a spatial candidate vector, a temporal candidate vector, an inter-view candidate vector, and a disparity candidate vector as motion vector candidates.

The spatial candidate vector indicates a motion vector of a neighbor block adjacent to the current block that is to be encoded. The motion vector candidate identifier 230 may verify whether the neighbor block adjacent to the current block has a motion vector, and may include the motion vector of the neighbor block in motion vector candidates as the spatial candidate vector. For example, the motion vector candidate identifier 230 may verify whether at least a left block of the current block, an upper end block of the current block, a left-upper end block of the current block, or a right-upper end block of the current block has a motion vector.

The temporal candidate vector indicates a motion vector of a co-located block located at the same location as the current block within a frame of a view image encoded prior to the first view image and having the same view as the first view image. For example, when a center location of the current block is assumed as (x, y), the co-located block refers to a block having a center location as (x, y) within a frame present at a location temporally different from the first view image. The frame of the view image encoded prior to the first view image refers to a frame present at a location temporally different from the first view image, and indicates a frame having the same view as the first view image.

Further, the temporal candidate vector may include a motion vector of a neighbor block adjacent to the co-located block. For example, the neighbor block of the co-located block may include at least a left block of the co-located block, an upper end block of the co-located block, a right-upper end block of the co-located block, or a left-upper end block of the co-located block. The motion vector candidate identifier 230 may verify whether the co-located block or the neighbor block of the co-located block has a motion vector, and may include the motion vector of the co-located block and/or the motion vector of the neighbor block adjacent to the co-located block in motion vector candidates as the temporal candidate vector.

The inter-view candidate vector indicates a motion vector of a corresponding block within a second view image corresponding to the current block. The second view image indicates a view image having a view different from the first view image. When a motion vector is present in the corresponding block of the second view image, the motion vector candidate identifier 230 may include the corresponding motion vector in motion vector candidates as the inter-view candidate vector.

The motion vector candidate identifier 230 may use a disparity vector to identify the presence or absence of the inter-view candidate vector. For example, to identify the presence or absence of the inter-view candidate vector, the motion vector candidate identifier 230 may use a disparity vector of the neighbor block of the current block, a disparity vector of the co-located block located at the same location as the current block within the frame of the view image encoded prior to the first view image and having the same view as the first view image, or a disparity vector of the neighbor block adjacent to the co-located block.

According to an example embodiment, the motion vector candidate identifier 230 may classify and thereby identify an inter-view candidate vector using a first inter-view candidate vector and a second inter-view candidate vector. When the first inter-view candidate vector is identical to the second inter-view candidate vector, the motion vector candidate identifier 230 may include only one of the two inter-view candidate vectors in motion vector candidates.

For example, the motion vector candidate identifier 230 may identify the first inter-view candidate vector using the disparity vector of the neighbor block adjacent to the current block. When the disparity vector is absent in the neighbor block adjacent to the current block, the motion vector candidate identifier 230 may identify the presence or absence of the inter-view candidate vector based on at least one of the disparity vector of the co-located block located at the same location as the current block within the frame of the view image encoded prior to the first view image having the same view as the first view image and the disparity vector of the neighbor block of the co-located block. The motion vector candidate identifier 230 may identify the second inter-view candidate vector based on at least one of the disparity vector of the co-located block located at the same location as the current block within the frame of the view image having the same view as the first view image and encoded prior to the first view image and the disparity vector of the neighbor block of the co-located block. When the disparity vector is absent in the co-located block and the neighbor block of the co-located block, the motion vector candidate identifier 230 may identify the presence or absence of the inter-view candidate vector based on the disparity vector of the neighbor block adjacent to the current block.

As another example, the motion vector candidate identifier 230 may identify the first inter-view candidate vector based on at least one of the disparity vector of the co-located block located at the same location as the current block within the frame of the view image having the same view as the first view image and encoded prior to the first view image and the disparity vector of the neighbor block of the co-located block. When the disparity vector is absent in the co-located block and the neighbor block adjacent to the co-located block, the motion vector candidate identifier 230 may identify the presence or absence of the inter-view candidate vector based on the disparity vector of the neighbor block adjacent to the current block. The motion vector candidate identifier 230 may identify the second inter-view candidate vector based on the disparity vector of the neighbor block adjacent to the current block. When the disparity vector is absent in the neighbor block adjacent to the current block, the motion vector candidate identifier 230 may identify the presence or absence of the inter-view candidate vector based on at least one of the disparity vector of the co-located block located at the same location as the current block within the frame of the view image having the same view as the first view image and encoded prior to the first view image and the disparity vector of the neighbor block of the co-located block.

According to another example embodiment, when the neighbor block adjacent to the current block does not have a disparity vector and has a motion vector, the motion vector candidate identifier 230 may determine whether the motion vector of the neighbor block adjacent to the current block is obtained based on the disparity vector. When the motion vector of the neighbor block is determined to be obtained based on the disparity vector, the motion vector candidate identifier 230 may identify the presence or absence of the inter-view candidate vector based on the corresponding disparity vector. When the neighbor block adjacent to the current block does not have a disparity vector and has a motion vector, the motion vector candidate identifier 230 may calculate a complexity of a process of identifying the inter-view candidate vector. When the complexity is greater than a preset threshold, the motion vector candidate identifier 230 may not include the inter-view candidate vector in motion vector candidates.

Also, when the co-located block or the neighbor block adjacent to the co-located block does not have a disparity vector and has a motion vector, the motion vector candidate identifier 230 may determine whether the motion vector of the co-located block or the neighbor block adjacent to the co-located block is obtained based on the disparity vector. When the motion vector of the co-located block or the neighbor block adjacent to the co-located block is determined to be obtained based on the disparity vector, the motion vector candidate identifier 230 may identify the presence or absence of the inter-view candidate vector, based on the corresponding disparity vector. When the co-located block or the neighbor block adjacent to the co-located block does not have a disparity vector and has a motion vector, the motion vector candidate identifier 230 may calculate a complexity of a process of identifying the inter-view candidate vector. When the complexity is greater than a preset threshold, the motion vector candidate identifier 230 may not include the inter-view candidate vector in motion vector candidates.

When the neighbor block adjacent to the current block does not have a disparity vector and has a motion vector, the motion vector candidate identifier 230 may determine whether the motion vector of the neighbor block is obtained based on the disparity vector. When the motion vector of the neighbor block is determined to be obtained based on the disparity vector, the motion vector candidate identifier 230 may identify the presence or absence of the inter-view candidate vector, based on the corresponding disparity vector.

When the inter-view candidate vector is absent, the motion vector candidate identifier 230 may determine a zero motion vector as the disparity vector of the current block, and may identify the presence or absence of the inter-view candidate vector based on the determined disparity vector of the current block. For example, when the inter-view candidate vector is absent, the motion vector candidate identifier 230 may set the disparity vector of the current block as the zero motion vector, and may identify a motion vector of a corresponding block corresponding to the current block from a view image of a different view. Alternatively, when the inter-view candidate vector is absent, the motion vector candidate identifier 230 may determine the zero motion vector as the inter-view candidate vector.

According to another example embodiment, when the neighbor block adjacent to the current block, the co-located block located at the same location as the current block within the frame of the view image having the same view as the first view image and encoded prior to the first view image, and the neighbor block adjacent to the co-located block do not have a disparity vector, the motion vector candidate identifier 230 may not include the inter-view candidate vector in motion vector candidates.

According to still another example embodiment, when the inter-view candidate vector is absent, the motion vector candidate identifier 230 may not include the inter-view candidate vector in motion vector candidates.

The disparity candidate vector indicates a disparity vector used to discover the corresponding block within the second view image corresponding to the current block. For example, the disparity candidate vector may include the disparity vector of the neighbor block adjacent to the current block, the disparity vector of the co-located block, or the disparity vector of the neighbor block adjacent to the co-located block. The motion vector candidate identifier 230 may identify the presence or absence of the disparity candidate vector, and may include the disparity vector used to discover the corresponding block within the second view image in motion vector candidates as the disparity candidate vector.

For example, when a disparity vector for the current block is discovered, the motion vector candidate identifier 230 may discover a corresponding block within a second view image indicated by the discovered disparity vector and may determine a motion vector of the corresponding block as the inter-view candidate vector. Here, the motion vector candidate identifier 230 may identify the disparity vector used to discover the corresponding block within the second view image, and may include the disparity vector in motion vector candidates as the disparity candidate vector.

When classifying and thereby identifying the inter-view candidate vector using the first inter-view candidate vector and the second inter-view candidate vector, the motion vector candidate identifier 230 may identify two disparity candidate vectors associated with each inter-view candidate vector. When the identified two disparity candidate vectors are identical, the motion vector candidate identifier 230 may include only one of the two disparity candidate vectors in motion vector candidates.

The predictive motion vector determiner 240 may determine a predictive motion vector to be used for encoding the current block based on the identified at least one motion vector candidate. The predictive motion vector determiner 240 may determine a most efficient motion vector candidate among motion vector candidates. For example, the predictive motion vector determiner 240 may determine a similarity level between the current block and a prediction block indicated by each of the motion vector candidates, and may determine a motion vector candidate corresponding to the prediction block most similar to the current block, as the predictive motion vector. For example, the predictive motion vector determiner 240 may identify a prediction block that uses a minimum number of bits to represent a difference between the current block and the prediction block, and may determine a motion vector candidate corresponding to the identified prediction block as a predictive motion vector.

The bitstream transmitter 250 may transmit an index of the predictive motion vector to the multi-view image decoding apparatus 220 through the bitstream.

When an encoding mode is a merge mode or an inter mode, the bitstream transmitter 250 may transmit a residual signal between the encoded current block and the prediction block indicated by the predictive motion vector to the multi-view image decoding apparatus 220 through a bitstream.

According to an example embodiment, a residual signal before being encoded may be predicted from a residual signal having occurred when encoding a second view image. A disparity vector may be used to predict the residual signal having occurred in the second view image. To predict the residual signal having occurred in the second view image, the disparity vector of the neighbor block adjacent to the current block, the disparity vector of the co-located block, or the disparity vector of the neighbor block adjacent to the co-located block may be used. For example, the residual signal having occurred in the second view image may be predicted based on the disparity vector of the neighbor block adjacent to the current block. When a disparity vector is absent in the neighbor block adjacent to the current block, the disparity vector of the co-located block or the disparity vector of the neighbor block adjacent to the co-located block may be used.

As another example, the residual signal having occurred in the second view image may be predicted based on the disparity vector of the co-located block or the disparity vector of the neighbor block adjacent to the co-located block. When the disparity vector is absent in the co-located block and the neighbor block adjacent to the co-located block, the disparity vector of the neighbor block adjacent to the current block may be used. The multi-view image coding apparatus 210 may encode a differential signal between the residual signal of the current block and the residual signal having occurred in the identified second view image based on the disparity vector. When a prediction block is predicted based on the second view image, the multi-view image coding apparatus 210 may not predict the residual signal having occurred in the second view image.

As another example, when the prediction block is predicted by using all of an image of the same view as the first view image and the second view image, the multi-view image coding apparatus 210 may not predict the residual signal having occurred in the second view image.

Figure 3:
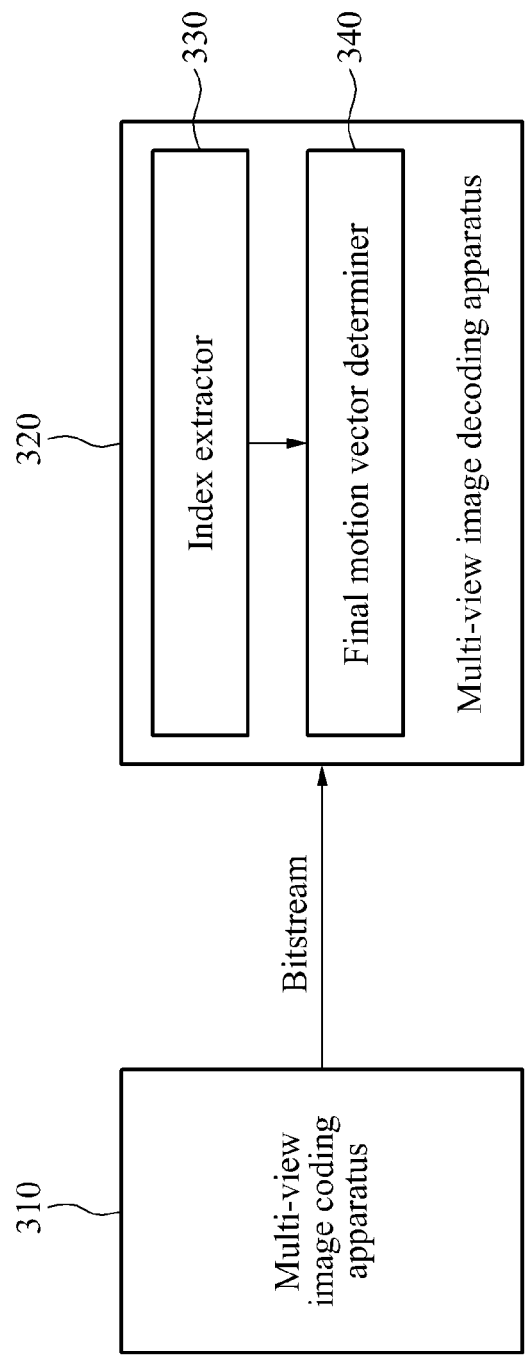
FIG. 3 is a block diagram illustrating a multi-view image decoding apparatus according to an example embodiment.

FIG. 3 is a block diagram illustrating a multi-view image decoding apparatus according to an example embodiment.

Referring to FIG. 3, a multi-view image decoding apparatus 320 may include an index extractor 330 and a final motion vector determiner 340.

The index extractor 330 may extract an index of a predictive motion vector from a bitstream received from a multi-view image coding apparatus 310. The final motion vector determiner 340 may determine a final motion vector of a current block within a first view image that is to be decoded based on the index of the predictive motion vector. For example, the final motion vector determiner 340 may determine the predictive motion vector as the final motion vector. According to another embodiment, the final motion vector determiner 340 may newly discover a prediction block that is more similar to the current block based on the predictive motion vector, and may determine a final motion vector based on the newly discovered prediction block.

The predictive motion vector may be determined based on a motion vector candidate identified by the multi-view image coding apparatus 310. The motion vector candidate may include at least one of an inter-view candidate vector, a spatial candidate vector, a temporal candidate vector, and a disparity candidate vector, however, the present disclosure is not limited thereto.

The spatial candidate vector indicates a motion vector of a neighbor block adjacent to the current block that is to be decoded. For example, the spatial candidate vector may include a motion vector of a left block of the current block, an upper end block of the current block, a left-upper end block of the current block, or a right-upper end block of the current block.

The temporal candidate vector indicates a motion vector of a co-located block located at the same location as the current block within a frame of a view image decoded prior to the first view image. The frame of the view image decoded prior to the first view image refers to a frame located at a location temporally different from the first view image and indicates a frame having the same view as the first view image. The temporal candidate vector may include a motion vector of a neighbor block adjacent to the co-located block.

The inter-view candidate vector indicates a motion vector of a corresponding block within a second view image corresponding to the current block that is to be decoded. For example, the inter-view candidate vector may be determined based on a disparity vector of a neighbor block adjacent to the current block, a disparity vector of a co-located block present at the same location as the current block within a frame of the view image having the same view as the first view image and decoded prior to the first view image, a disparity vector of a neighbor block of the co-located block, or a zero motion vector.

The disparity candidate vector indicates a disparity vector used to discover a corresponding block within the second view image corresponding to the current block. For example, the disparity candidate vector may include the disparity vector of the neighbor block adjacent to the current block, the disparity vector of the co-located block, or the disparity vector of the neighbor block adjacent to the co-located block.

Figure 4:
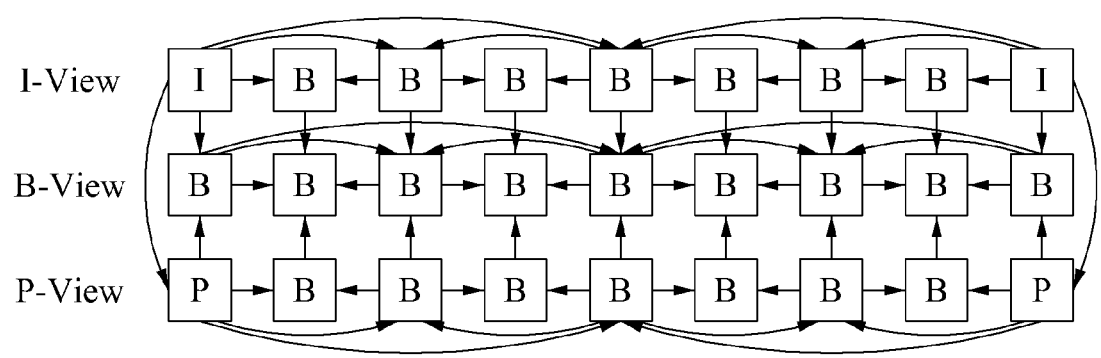
FIG. 4 illustrates a structure of a multi-view image according to an example embodiment.

FIG. 4 illustrates a structure of a multi-view image according to an example embodiment.

FIG. 4 is illustrated to explain an example multi-view video coding (MVC) method for performing encoding using a group of picture (GOP) "8" when images of three views, for example, a left view, a center view, and a right view, are received according to an embodiment. A GOP indicates a group of continuous images starting from an I-frame.

Since the concept of a hierarchical B picture or a hierarchical B frame is used for a temporal axis and a view axis during a multi-view image encoding process, the redundancy between images may be reduced.

The multi-view image coding apparatus 110 of FIG. 1 may sequentially encode a left image, also referred to as a left picture, (I-view), a right image, also referred to as a right picture (P-view), and a center image, also referred to as a center picture (B-view) based on the structure of the multi-view image of FIG. 4, and thus, may encode images corresponding to the three views. In this example, the multi-view image coding apparatus 110 may initially encode the right image or the center image and may perform encoding in order different from the above order.

During a process of encoding the left image, an area similar to the left image may be discovered from previous images using a motion estimation and temporal redundancy may be reduced using information about the discovered area. Since the right image to be encoded after the left image is encoded by referring to the encoded left image, inter-view redundancy using a disparity estimation as well as the temporal redundancy using the motion estimation may also be reduced. In addition, since the center image is encoded using the disparity estimation by referring to all of the left image and the right image that are already encoded, the inter-view redundancy may be reduced.

Referring to FIG. 4, during the multi-view image encoding process, an image, for example, the left image, encoded without using an image of a different view may be defined as an I-view image. An image, for example, the right image, encoded by uni-directionally predicting an image of a different view may be defined as a P-view image. An image, for example, the center image, encoded by bi-directionally predicting images of different views may be defined as a B-view image.

Figure 5:
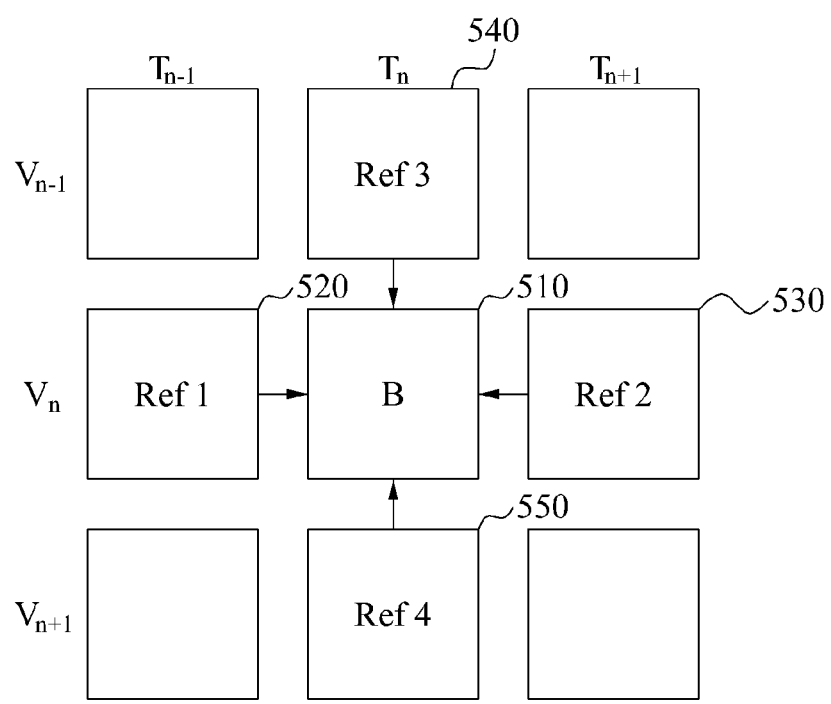
FIG. 5 illustrates a reference image used for coding a current block according to an example embodiment.

FIG. 5 illustrates a reference image used for coding a current block according to an example embodiment.

When encoding a current block included in a current view image B 510, a multi-view image coding apparatus may use, as reference images, images 540 and 550 adjacent to the current view image B 510 based on a view or images 520 and 530 adjacent to the current view image B 510 based on a time. For example, the multi-view image coding apparatus may identify a prediction block most similar to a current block from among the images 520, 530, 540, and 550, and may encode a residual signal (residue) between the current block and the prediction block. H.264/AVC may include, as an encoding mode for discovering a prediction block using a reference image, SKIP (P Slice Only)/Direct (B Slice Only), 16×16, 16×8, 8×16, P8×8 modes, and the like. High efficiency video coding (HEVC) may include, as an encoding mode for discovering a prediction block using a reference image, merge (SKIP/DIRECT), 2N×2N, N×N, 2N×N, N×2N modes, and the like.

During a process of encoding a current block, the multi-view image coding apparatus may use, as reference images, the images 520 and 530 adjacent to the current view image B 510 based on a time to reduce the temporal redundancy. In addition, to reduce the inter-view redundancy, the multi-view image coding apparatus may use, as reference images, the images 540 and 550 adjacent to the view image B 510 based on a view. The multi-view image coding apparatus may use the images 520 and 530, that is, a Ref1 image and a Ref2 image, respectively, to remove the temporal redundancy, and may use the images 540 and 550, that is, a Ref3 image and a Ref4 image, respectively, to remove the inter-view redundancy.

Figure 6:
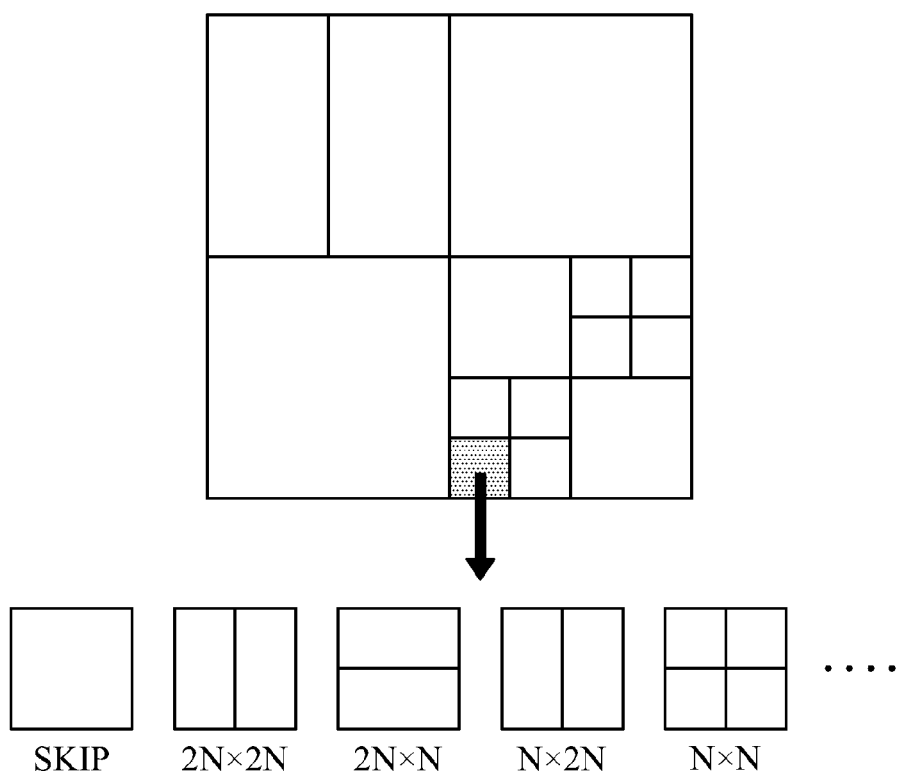
FIG. 6 illustrates an encoding mode used to encode a multi-view image according to an example embodiment.

FIG. 6 illustrates an encoding mode used to encode a multi-view image according to an example embodiment.

To predict a coding unit block, a multi-view image coding apparatus may segment a view image into a plurality of blocks. A size of a segmented block may be diversified for each block. The multi-view image coding apparatus may apply a variety of compression modes, for example, a merge mode, an inter mode such as 2N×2N, N×N, 2N×N, and N×2N, and an intra mode, to the segmented blocks. The multi-view image coding apparatus may determine an encoding mode most suitable for each of the segmented blocks among the encoding modes, and may encode a segmented block based on the determined encoding mode.

In the merge mode among the compression modes, motion information of blocks to be encoded is not encoded. Thus, an amount of bits required to encode and thereby transmit the multi-view image may be reduced. The more frequently the merge mode is selected during a view image encoding process, the further the encoding performance is enhanced.

Figure 7:
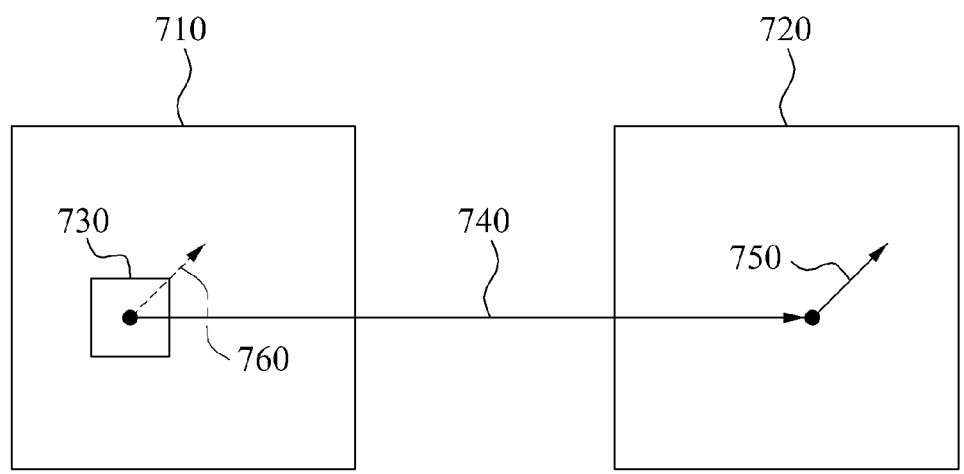
FIG. 7 illustrates a process of identifying an inter-view candidate vector using a disparity vector according to an example embodiment.

FIG. 7 illustrates a process of identifying an inter-view candidate vector using a disparity vector according to an example embodiment.

Referring to FIG. 7, a multi-view image coding apparatus may identify an inter-view candidate vector 760 associated with encoding of a current block 730 based on a disparity vector 740 with respect to the current block 730 in a first view image 710.

For example, the multi-view image coding apparatus may use a neighbor block of the current block 730, a disparity vector of a co-located block located at the same location as the current block 730 within a frame of a view image having the same view as the first view image and encoded prior to the first view image 710, or the disparity vector 740 of a neighbor block adjacent to the co-located block. The multi-view image coding apparatus may determine a motion vector 750 of a corresponding block within a second view image 720 indicated by the disparity vector 740, as the inter-view candidate vector 760.

According to another example embodiment, the multi-view image coding apparatus may determine a zero motion vector as the disparity vector 740 of the current block 730, may identify the motion vector 750 of the corresponding block within the second view image 720 corresponding to the current block 730 based on the disparity vector 740 of the zero motion vector, and may determine the identified motion vector 750 as the inter-view candidate vector 760.

According to still another example embodiment, when a neighbor block adjacent to the current block 730 does not have a disparity vector and has a motion vector, and when the motion vector of the neighbor block is obtained based on the disparity vector, the multi-view image coding apparatus may identify presence or absence of the inter-view candidate vector 760 based on the corresponding disparity vector 740. When the co-located block or a neighbor block adjacent to the co-located block does not have a disparity vector and has a motion vector, and when the motion vector of the co-located block or the neighbor block adjacent to the co-located block is obtained based on the disparity vector, the multi-view image coding apparatus may identify presence or absence of the inter-view candidate vector 760 based on the corresponding disparity vector 740.

Figure 8A:
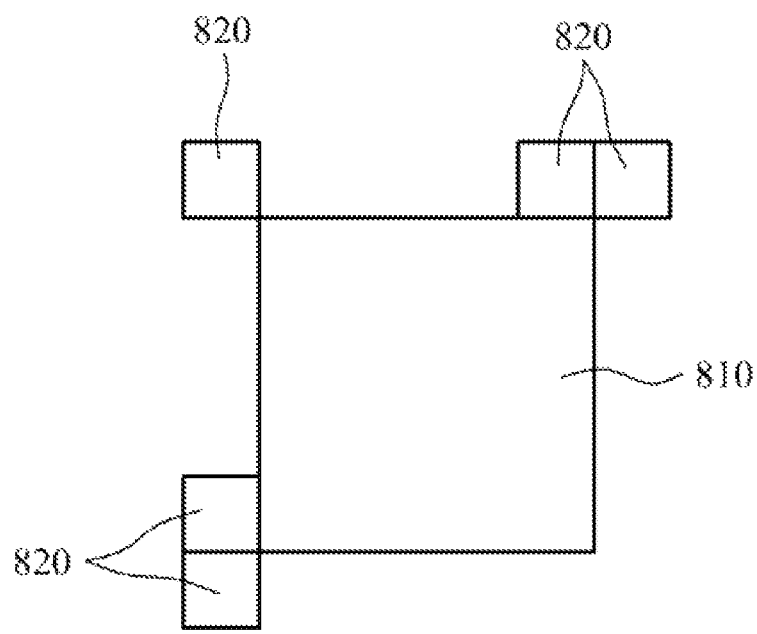
FIGS. 8a and 8b illustrate a process of inducing a disparity vector according to an example embodiment.
Figure 8B:
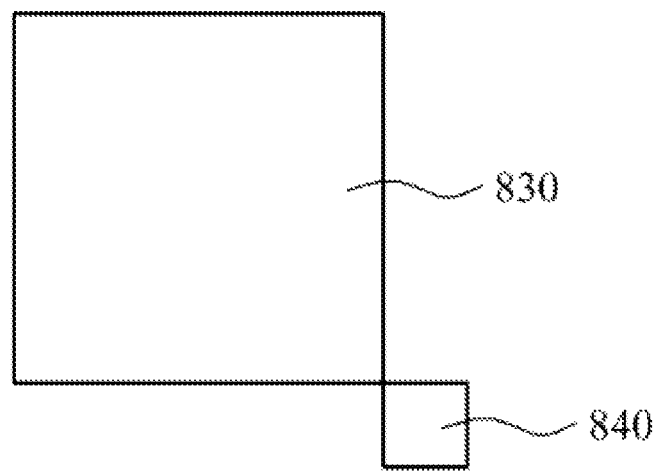

FIGS. 8a and 8b illustrate a process of inducing a disparity vector according to an example embodiment.

FIG. 8a describes a process of inducing a disparity vector using a neighbor block 820 of a current block 810 when the multi-view image coding apparatus is to identify an inter-view candidate vector. In FIG. 8a, a motion vector of the neighbor block 820 adjacent to the current block 810 may correspond to a spatial candidate vector. The multi-view image coding apparatus may identify a motion vector of a corresponding block with a second view image as a motion vector of the inter-view candidate vector, based on a disparity vector of the neighbor block 820 adjacent to the current block 810.

FIG. 8b describes a process of inducing a disparity vector using a co-located block 830 located at the same location as a current block within a frame of a view image having the same view as the first view image and encoded prior to a first view image or a neighbor block 840 adjacent to the co-located block 830 when the multi-view image coding apparatus is to identify an inter-view candidate vector. In FIG. 8b, a motion vector of the co-located block 830 and/or a motion vector of the neighbor block 840 adjacent to the co-located block 830 may correspond to a temporal candidate vector. The multi-view image coding apparatus may identify a motion vector of a corresponding block within a second view image as a motion vector of the inter-view candidate vector, based on a disparity vector of the co-located block 830 or a disparity vector of the neighbor block 840 adjacent to the co-located block 830.

Figure 9:
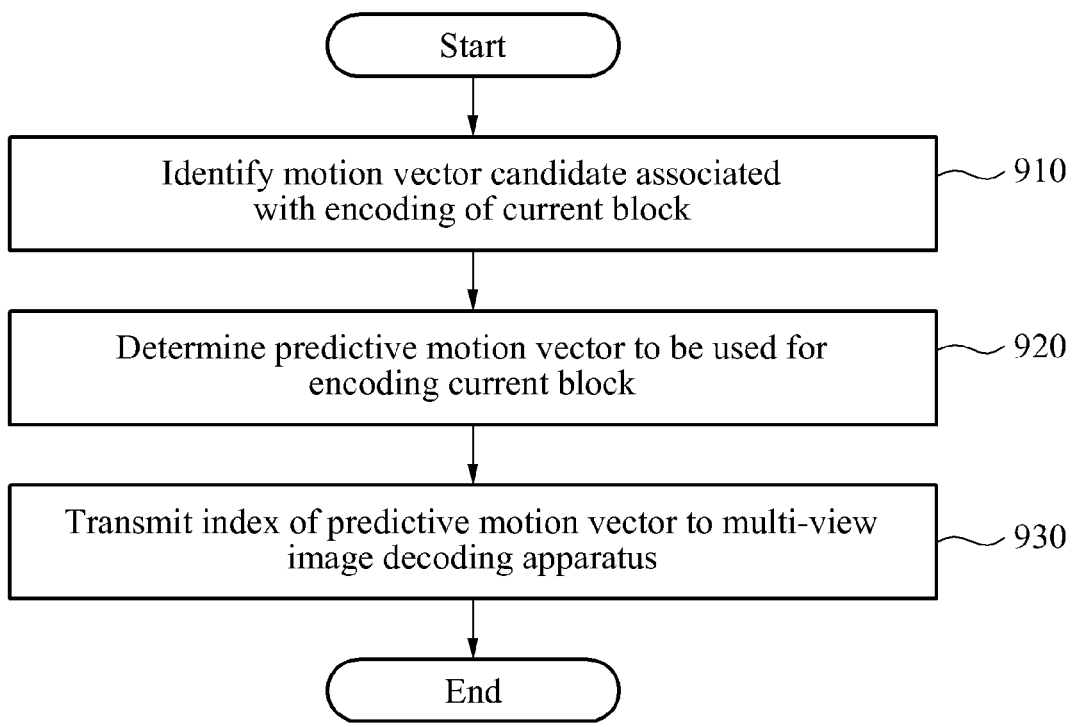
FIG. 9 is a flowchart illustrating a method of encoding a multi-view image according to an example embodiment.

FIG. 9 is a flowchart illustrating a method of encoding a multi-view image according to an example embodiment.

In operation 910, a multi-view image coding apparatus may identify a motion vector candidate associated with encoding of a current block within a first view image. For example, the multi-view image coding apparatus may identify at least one of a spatial candidate vector, a temporal candidate vector, an inter-view candidate vector, and a disparity candidate vector as the motion vector candidates.

The multi-view image coding apparatus may identify whether a neighbor block adjacent to the current block has a motion vector, and may include the motion vector of the neighbor block in motion vector candidates as the spatial candidate vector. The multi-view image coding apparatus may identify whether a co-located block or a neighbor block adjacent to the co-located block has a motion vector, and may include the motion block of the co-located block and/or the motion vector of the neighbor block adjacent to the co-located block in motion vector candidates as the temporal candidate vector.

When a motion vector is present in a corresponding block of a second view image, the multi-view image coding apparatus may include the corresponding motion vector in motion vector candidates as the inter-view candidate vector. The multi-view image coding apparatus may use a disparity vector to identify presence or absence of the inter-view candidate vector. To identify the presence or absence of the inter-view candidate vector, the multi-view image coding apparatus may use at least one of a disparity vector of the neighbor block adjacent to the current block, a disparity vector of the co-located block located at the same location as the current block within a frame of a view image having the same view as the first view image and encoded prior to the first view image, a disparity vector of the neighbor block of the co-located block, and a zero motion vector.

According to an example embodiment, the multi-view image coding apparatus may classify and thereby identify an inter-view candidate vector using a first inter-view candidate vector and a second inter-view candidate vector. When the first inter-view candidate vector is identical to the second inter-view candidate vector, the multi-view image coding apparatus may include only one of the two inter-view candidate vectors in motion vector candidates.

According to another example embodiment, when the inter-view candidate vector is absent, the multi-view image coding apparatus may determine a zero motion vector as a disparity vector of the current block and may identify the presence or absence of the inter-view candidate vector based on the determined disparity vector of the current block. According to still another example embodiment, when the inter-view candidate vector is absent, the multi-view image coding apparatus may not include the inter-view candidate vector in motion vector candidates.

The multi-view image coding apparatus may identify the presence or absence of the disparity candidate vector and may include the disparity vector used to discover the corresponding block within the second view image in motion vector candidates as the disparity candidate vector.

In operation 920, the multi-view image coding apparatus may determine a predictive motion vector to be used for encoding the current block based on the identified motion vector candidate. The multi-view image coding apparatus may determine a most efficient motion vector candidate among the motion vector candidates. For example, as discussed above, a similarity level between the current block and a prediction block indicated by each of the motion vector candidates is determined, and a motion vector candidate corresponding to the prediction block most similar to the current block is determined as the predictive motion vector.

In operation 930, the multi-view image coding apparatus may transmit an index of the predictive motion vector to a multi-view image decoding apparatus through a bitstream.

Figure 10:
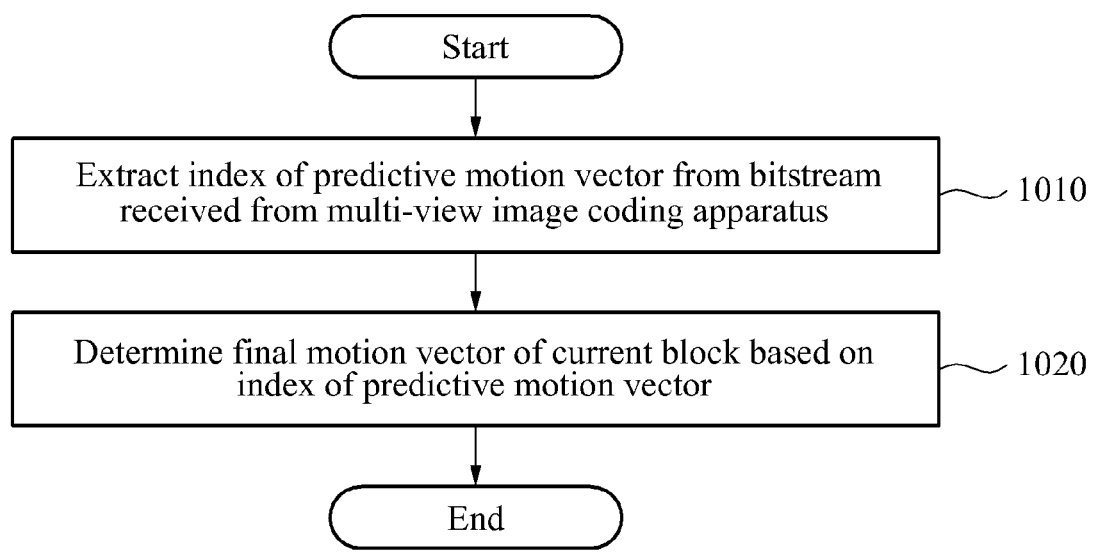
FIG. 10 is a flowchart illustrating a method of decoding a multi-view image according to an example embodiment.

FIG. 10 is a flowchart illustrating a method of decoding a multi-view image according to an example embodiment.

In operation 1010, a multi-view image decoding apparatus may extract an index of a predictive motion vector from a bitstream received from a multi-view image coding apparatus. The predictive motion vector may be determined based on a motion vector candidate identified by the multi-view image coding apparatus. The motion vector candidate may include at least one of an inter-view candidate vector, a spatial candidate vector, a temporal candidate vector, and a disparity candidate vector.

The spatial candidate vector indicates a motion vector of a neighbor block adjacent to the current block that is to be decoded. The temporal candidate vector indicates a motion vector of a co-located block located at the same location as the current block within a frame of a view image decoded prior to the first view image. The frame of the view image decoded prior to the first view image refers to a frame located at a location temporally different from the first view image and indicates a frame having the same view as the first view image. The temporal candidate vector may include a motion vector of the neighbor block adjacent to the co-located block.

The inter-view candidate vector indicates a motion vector of a corresponding block within a second view image corresponding to the current block that is to be decoded. The inter-view candidate vector may be determined based on at least one of a disparity vector of the neighbor block adjacent to the current block, a disparity vector of the co-located block located at the same location as the current block within the frame of the view image decoded prior to the first view image having the same view as the first view image, a disparity vector of the neighbor block of the co-located block, and a zero motion vector.

The disparity candidate vector indicates a disparity vector used to discover a corresponding block within the second view image corresponding to the current block. For example, the disparity candidate vector may include at least one of the disparity vector of the neighbor block adjacent to the current block, the disparity vector of the co-located block, and the disparity vector of the neighbor block adjacent to the co-located block.

In operation 1020, the multi-view image decoding apparatus may determine a final motion vector of the current block within the first view image to be decoded based on the index of the predictive motion vector. For example, the multi-view image decoding apparatus may determine the predictive motion vector as the final motion vector. According to another embodiment, the multi-view image decoding apparatus may newly discover a prediction block further similar to the current block based on the predictive motion vector, and may determine a final motion vector based on the newly discovered prediction block. When the final motion vector is determined, the multi-view image decoding apparatus may restore the current block based on the final prediction block indicated by the final motion vector.

The above-described example embodiments may be recorded in non-transitory computer-readable media including program instructions to implement various operations embodied by a computer. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. The non-transitory computer-readable media may also be a distributed network, so that the program instructions are stored and executed in a distributed fashion. The program instructions may be executed by one or more processors. The non-transitory computer-readable media may also be embodied in at least one application specific integrated circuit (ASIC) or Field Programmable Gate Array (FPGA), which executes (processes like a processor) program instructions. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

Although example embodiments have been shown and described, it would be appreciated by those skilled in the art that changes may be made in these example embodiments without departing from the principles and spirit of the disclosure, the scope of which is defined by the claims and their equivalents.

What is claimed is:

1. A multi-view image coding method, comprising:
   identifying at least one motion vector candidate associated with encoding of a current block within a first view image;
   determining a predictive motion vector used for encoding the current block based on the identified at least one motion vector candidate; and
   transmitting an index of the determined predictive motion vector to a multi-view image decoding apparatus through a bitstream
   wherein the identifying of the at least one motion vector candidate comprises:
     identifying an inter-view candidate vector based on a disparity vector of a co-located block located at a same location as the current block within a frame of a view image encoded prior to the first view image if the disparity vector of the co-located block exists, and
     identifying the inter-view candidate vector based on a disparity vector of a neighbor block adjacent to the current block if the disparity vector of the co-located block does not exist.

2. The method of claim 1, wherein the identifying of the at least one motion vector candidate comprises identifying presence or absence of an inter-view candidate vector indicating a motion vector of a corresponding block within a second view image corresponding to the current block.

3. The method of claim 2, wherein the identifying of the at least one motion vector candidate comprises identifying the presence or absence of the inter-view candidate vector based on a disparity vector of a neighbor block adjacent to the current block.

4. The method of claim 3, wherein the identifying of the at least one motion vector candidate comprises identifying the presence or absence of the inter-view candidate vector based on at least one of a disparity vector of a co-located block located at the same location as the current block within a frame of a view image encoded prior to the first view image and a disparity vector of a neighbor block of the co-located block, when a disparity vector is absent in a neighbor block adjacent to the current block,
wherein the view image encoded prior to the first view image has the same view as the first view image.

5. The method of claim 2, wherein the identifying of the at least one motion vector candidate comprises identifying the presence or absence of the inter-view candidate vector based on at least one of a disparity vector of a co-located block located at the same location as the current block within a frame of a view image encoded prior to the first view image and a disparity vector of a neighbor block of the co-located block,
wherein the view image encoded prior to the first view image has the same view as the first view image.

6. The method of claim 5, wherein the identifying of the at least one motion vector candidate comprises identifying the presence or absence of the inter-view candidate vector based on a disparity vector of a neighbor block adjacent to the current block, when the disparity vector of the co-located block and the disparity vector of the neighbor block adjacent to the co-located block are absent.

7. The method of claim 2, wherein the identifying of the at least one motion vector candidate comprises determining a zero motion vector as a disparity vector of the current block and identifying the presence or absence of the inter-view candidate vector based on the determined disparity vector, when the inter-view candidate vector is absent.

8. The method of claim 2, wherein the identifying of the at least one motion vector candidate comprises determining a zero motion vector as the inter-view candidate vector, when the inter-view candidate vector is absent.

9. The method of claim 2, wherein the identifying of the at least one motion vector candidate comprises not including the inter-view candidate vector in the at least one motion vector candidate when a neighbor block adjacent to the current block, a co-located block located at the same location as the current block within a frame of a view image encoded prior to the first view image having the same view as the first view image, and a neighbor block adjacent to the co-located block do not have a disparity vector.

10. The method of claim 2, wherein the identifying of the at least one motion vector candidate comprises:
determining whether a motion vector of a neighbor block adjacent to the current block is obtained based on a disparity vector, when the neighbor block adjacent to the current block does not have a disparity vector and has a motion vector; and
identifying the presence or absence of the inter-view candidate vector based on the disparity vector, when the motion vector of the neighbor block is determined to be obtained based on the disparity vector.

11. The method of claim 2, wherein the identifying of the at least one motion vector candidate comprises:
determining whether a motion vector of a co-located block located at the same location as the current block within a frame of a view image encoded prior to the first view image is obtained based on a disparity vector when the co-located block does not have a disparity vector and has a motion vector; and
identifying the presence or absence of the inter-view candidate vector based on the disparity vector when the motion vector of the co-located block is determined to be obtained based on the disparity vector,
wherein the view image has the same view as the first view image.

12. The method of claim 2, wherein the identifying of the at least one motion vector candidate comprises not including the inter-view candidate vector in the at least one motion vector candidate when the inter-view candidate vector is absent.

13. The method of claim 1, wherein the identifying of the at least one motion vector candidate comprises identifying presence or absence of a spatial candidate vector indicating a motion vector of a neighbor block adjacent to the current block.

14. The method of claim 1, wherein the identifying of the at least one motion vector candidate comprises identifying presence or absence of a temporal candidate vector indicating a motion vector of a co-located block located at the same location as the current block within a frame of a view image encoded prior to the first view image and a motion vector of a neighbor block adjacent to the co-located block,
wherein the view image encoded prior to the first view image has the same view as the first view image.

15. The method of claim 1, wherein the identifying of the at least one motion vector candidate comprises identifying presence or absence of a disparity candidate vector indicating a disparity vector used to discover a corresponding block within a second view image corresponding to the current block.

16. The method of claim 1,
wherein the identifying the inter-view candidate vector based on a disparity vector of a neighbor block adjacent to the current block comprises:
identifying a disparity vector of a left neighbor block of the current block if the disparity vector of a left neighbor block exists; and
identifying a disparity vector of a top neighbor block of the current block if the disparity vector of a left neighbor block does not exist.

17. The method of claim 1,
wherein the identifying of the at least one motion vector candidate further comprises identifying a disparity vector of a temporal neighbor block of the co-located block if the disparity vector of the co-located block exists.

18. A multi-view image decoding method, comprising:
extracting an index of a predictive motion vector from a bitstream received from a multi-view image coding apparatus; and
determining a final motion vector of a current block within a first view image to be decoded based on the index of the predictive motion vector,
wherein the predictive motion vector is determined based on at least one motion vector candidate identified by the multi-view image coding apparatus, and
wherein the at least one motion vector candidate comprises at least one of an inter-view candidate vector, a spatial candidate vector, a temporal candidate vector, and a disparity candidate vector, wherein the temporal candidate vector is identified by the multi-view image coding apparatus if the temporal candidate vector exists and the spatial candidate vector is identified by the multi-view image coding apparatus if the temporal candidate vector does not exist, wherein the temporal candidate vector includes a disparity vector of a co-located block located at the same location as the current block within a frame of a view image encoded prior to the first view image, and wherein the spatial candidate vector includes a disparity vector of the co-located block and the disparity vector of the neighbor block adjacent to the co-located block within the first view image.

19. The method of claim 18, wherein the inter-view candidate vector indicates a motion vector of a corresponding block within a second view image corresponding to the current block, wherein the disparity candidate vector indicates a disparity vector used to discover a corresponding block within a second view image corresponding to the current block.

20. The method of claim 19, wherein the inter-view candidate vector is determined based on at least one of a disparity vector of a neighbor block adjacent to the current block, a disparity vector of a co-located block located at the same location as the current block within a frame of a view image decoded prior to the first view image and having the same view as the first view image, and a disparity vector of a neighbor block of the co-located block.

21. A non-transitory computer-readable media storing a program to implement the method according to claim 1.

22. A multi-view image decoding apparatus, comprising:

an index extractor configured to extract an index of a predictive motion vector from a bitstream received from a multi-view image coding apparatus; and a final motion vector determiner configured to determine a final motion vector of a current block within a first view image that is decoded based on the index of the predictive motion vector, wherein the predictive motion vector is determined based on at least one motion vector candidate identified by the multi-view image coding apparatus, and wherein the at least one motion vector candidate comprises at least one of an inter-view candidate vector, a spatial candidate vector, a temporal candidate vector, and a disparity candidate vector, wherein the temporal candidate vector is identified by the multi-view image coding apparatus if the temporal candidate vector exists and the spatial candidate vector is identified by the multi-view image coding apparatus if the temporal candidate vector does not exist, wherein the temporal candidate vector includes a disparity vector of a co-located block located at the same location as the current block within a frame of a view image encoded prior to the first view image, and wherein the spatial candidate vector includes a disparity vector of the co-located block and the disparity vector of the neighbor block adjacent to the co-located block within the first view image.

\* \* \* \* \*